(12) United States Patent
Kapelewski et al.

(10) Patent No.: US 12,397,489 B2
(45) Date of Patent: Aug. 26, 2025

(54) METHODS OF MAKING METAL-ORGANIC FRAMEWORK EXTRUDATES

(71) Applicant: ExxonMobil Technology and Engineering Company, Annandale, NJ (US)

(72) Inventors: Matthew T. Kapelewski, Flemington, NJ (US); Jean W. Beeckman, Annandale, NJ (US); Gerardo J. Majano, Basking Ridge, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 592 days.

(21) Appl. No.: 17/779,343

(22) PCT Filed: Jul. 27, 2020

(86) PCT No.: PCT/US2020/043768
§ 371 (c)(1),
(2) Date: May 24, 2022

(87) PCT Pub. No.: WO2021/107993
PCT Pub. Date: Jun. 3, 2021

(65) Prior Publication Data
US 2023/0001617 A1   Jan. 5, 2023

Related U.S. Application Data

(60) Provisional application No. 62/940,285, filed on Nov. 26, 2019.

(51) Int. Cl.
*B29C 48/00* (2019.01)
*B29C 48/91* (2019.01)
*B29K 105/04* (2006.01)

(52) U.S. Cl.
CPC ............ *B29C 48/022* (2019.02); *B29C 48/91* (2019.02); *B29C 2948/92704* (2019.02); *B29K 2105/04* (2013.01)

(58) Field of Classification Search
CPC .. B01J 20/3007; B01J 20/262; B01J 20/2803; B01J 20/305; B01J 20/3071;
(Continued)

(56) References Cited

U.S. PATENT DOCUMENTS 1,332,847 A * 3/1920 Kent ...................... B26D 3/003
                                                                  12/147 R
2,973,327 A * 2/1961 Mitchell ................ B01J 20/183
                                                                  502/8

(Continued)

FOREIGN PATENT DOCUMENTS

WO   WO-2008051904 A1 *   5/2008
WO   WO-2015054332 A1 *   4/2015   .............. B01J 20/20
(Continued)

OTHER PUBLICATIONS

Brunauer, S. et al. (1938) "Adsorption of Gases in Multimolecular Layers," *J. Am. Chem. Soc.*, v.60(2), pp. 309-319.
(Continued)

*Primary Examiner* — Galen H Hauth
*Assistant Examiner* — Baileigh Kate Darnell
(74) *Attorney, Agent, or Firm* — Shook, Hardy & Bacon L.L.P.

(57) ABSTRACT

Methods making a metal-organic framework extrudate in an extruder comprising the steps of: (a) mixing a metal-organic framework material with an extrusion aid to form a metal-organic framework extrudate mixture; and (b) extruding the metal-organic framework mixture in the extruder to produce the metal-organic framework extrudate where the pressure within the extruder is reduced between about 10% to about
(Continued)

55% when compared to pressure within the extruder when extruding the metal-organic framework material without the extrusion aid. The extrusion aid can be a liquid extrusion aid, a solid extrusion aid and/or a polymeric extrusion aid.

17 Claims, 2 Drawing Sheets

(58) Field of Classification Search
CPC ... B01J 20/3078; B01J 20/226; B29C 48/022; B29C 48/91; B29C 2948/92704; B29K 2105/04

See application file for complete search history.

(56) References Cited

U.S. PATENT DOCUMENTS

| | | | | |
|---|---|---|---|---|
| 3,634,331 | A * | 1/1972 | Neddenreip | B01J 20/18 |
| | | | | 502/67 |
| 4,441,990 | A * | 4/1984 | Huang | C07C 5/2708 |
| | | | | 585/475 |
| 6,517,807 | B2 | 2/2003 | Verduijn et al. | 423/709 |
| 9,370,771 | B2 * | 6/2016 | Gaab | B01J 20/28042 |
| 2003/0148165 | A1 * | 8/2003 | Muller | F17C 11/005 |
| | | | | 206/0.7 |
| 2003/0222023 | A1 * | 12/2003 | Mueller | B01J 20/28042 |
| | | | | 210/656 |
| 2006/0210458 | A1 * | 9/2006 | Mueller | B01J 20/226 |
| | | | | 422/231 |
| 2007/0062369 | A1 * | 3/2007 | Pfenninger | B01D 53/02 |
| | | | | 423/700 |
| 2009/0216056 | A1 * | 8/2009 | Beeckman | B01J 37/0009 |
| | | | | 264/176.1 |
| 2010/0166644 | A1 * | 7/2010 | Schubert | B01D 53/02 |
| | | | | 556/181 |
| 2011/0011805 | A1 * | 1/2011 | Schubert | B01J 20/0233 |
| | | | | 210/689 |
| 2011/0105776 | A1 * | 5/2011 | Muller | B01J 20/226 |
| | | | | 562/480 |
| 2012/0082864 | A1 * | 4/2012 | Leung | C07F 5/069 |
| | | | | 428/689 |
| 2012/0270731 | A1 * | 10/2012 | Gaab | B01D 53/02 |
| | | | | 502/402 |
| 2013/0068663 | A1 * | 3/2013 | Beeckman | B01J 29/126 |
| | | | | 502/79 |
| 2014/0208650 | A1 | 7/2014 | Gaab et al. | 48/127.7 |
| 2018/0141033 | A1 * | 5/2018 | Beeckman | B01J 35/63 |
| 2019/0309231 | A1 * | 10/2019 | O'Neill | B01J 21/04 |
| 2023/0001617 | A1 * | 1/2023 | Kapelewski | B29C 48/022 |
| 2024/0383836 | A1 * | 11/2024 | Kapelewski | C07C 51/15 |

FOREIGN PATENT DOCUMENTS

| | | | | |
|---|---|---|---|---|
| WO | WO2017/089344 | | 6/2017 | ............. B01J 20/22 |
| WO | WO-2019028022 A1 * | | 2/2019 | ............. B01J 29/072 |
| WO | WO2020/159630 | | 8/2020 | ............. B01J 20/30 |
| WO | WO2021/107992 | | 6/2021 | ............. B01J 20/22 |

OTHER PUBLICATIONS

Langmuir, I. (1916) "The Constitution and Fundamental Properties of Solids and Liquids. Part I. Solids," *J. Am. Chem. Soc.*, v.38(11), pp. 2221-2295.

Walton, K. et al. (2007) "Applicability of the BET Method for Determining Surface Areas of Microporous Metal-Organic Frameworks," *J. Am. Chem. Soc.*, v.129(27), pp. 8552-8556.

* cited by examiner

METHODS OF MAKING METAL-ORGANIC FRAMEWORK EXTRUDATES

CROSS REFERENCE TO RELATED APPLICATIONS

This application is a national stage filing of Patent Cooperation Treaty Application No. PCT/US2020/043768 filed Jul. 27, 2020, which claims priority to U.S. Provisional Application No. 62/940,285, filed Nov. 26, 2019.

FIELD

The present disclosure generally relates to metal-organic framework ("MOF") extrudates. More specifically the disclosure relates to methods of making MOF extrudates which preserve the structural integrity of the MOF material and strengthen the mechanical strength of the MOF extrudate.

BACKGROUND OF THE INVENTION

Materials displaying a large internal surface area, defined by pores or channels, are of predominant interest for applications in catalysis, for absorption and/or adsorption techniques, ion exchanging, chromatography, storage and/or uptake of substances, among others.

Among the many various strategies to create microporous and/or mesoporous active materials, the formation of metal-organic frameworks ("MOFs") using metal ions and molecular organic building blocks is particularly advantageous. MOF materials provide many advantages including: (i) larger pore sizes can be realized than for the zeolites used presently; (ii) the internal surface area is larger than for porous materials used presently; (iii) pore size and/or channel structure can be tailored over a large range; and/or (iv) the organic framework components of the internal surface can be functionalized easily.

MOFs are hybrid materials composed of metal ions or clusters coordinated to multi-topic organic linkers that self-assemble to form a coordination network. These materials have wide-ranging potential uses in many different applications including gas storage, gas separation, catalysis, sensing, environmental remediation, etc. In many of these applications, shaped particles are often used to avoid large pressure drops in a reactor bed or to ease material handling. Shaping of materials can embody various forms such as extrudates, rings, pellets, spheres, etc. In order to decrease the generation of fines during shipping or during application, shaped particles must have sufficient mechanical strength to withstand compressive force generated by process conditions or by the pressure exerted by the weight of the catalyst bed. However, extrusion of materials comprising MOFs is a relatively unexplored field that is required for the formulation of these novel materials for multiple applications.

MOFs can be damaged during the extrusion process from the high pressure and temperature and other conditions. Furthermore, binders are often required to improve the mechanical strength of the resulting extrudates, but many binders are incompatible with MOFs, primarily based on a lack of compatible surfaces.

Therefore, a need exists for methods of making MOF extrudates without degrading the structural integrity of the MOF materials as well as improve the mechanical strength of the MOF extrudate.

SUMMARY

The present disclosure relates to methods of making metal-organic framework extrudates using one or more extrusion aids to reduce pressure during the extrusion process and preserve the structural integrity of the metal-organic framework. The present methods can also improve the mechanical strength in metal-organic framework extrudates.

Provided herein are methods making a metal-organic framework extrudate in an extruder comprising the steps of: (a) mixing a metal-organic framework material with an extrusion aid to form a metal-organic framework extrudate mixture; and (b) extruding the metal-organic framework mixture in the extruder to produce the metal-organic framework extrudate, wherein pressure within the extruder is reduced between about 10% to about 55% when compared to pressure within the extruder when extruding the metal-organic framework material without the extrusion aid. As described, the extrusion aid can be a liquid extrusion aid, a solid extrusion aid and/or a polymeric extrusion aid. The liquid extrusion aid can be a linear $C_3$ to $C_{10}$ alkyl alcohol or a branched $C_3$ to $C_{10}$ alkyl alcohol. In an embodiment, the liquid extrusion aid is selected from the group of 1-propanol, iso-propanol, 1-butanol, iso-butanol, 1-hexanol, 1-heptanol. In an embodiment, the liquid extrusion aid comprises water in a range of between about 0.5 vol % to 95 vol %.

The solid extrusion aid can be graphite, magnesium stearate or a saturated or unsaturated $C_{10+}$ organic acid or salt thereof. In an embodiment, the solid extrusion aid is mixed with the metal-organic framework material in a range of between about 0.5 wt % to about 30 wt %.

The polymeric extrusion aid can be a polyvinyl amide, a polyacrylate, a polycarbonate, a polyamide, a polyester, a polyether, a polyvinyl amine, a polyvinyl alcohol, a polyvinyl ester, or combination(s) thereof. In an embodiment, the polymeric extrusion aid is polyvinyl alcohol. In an embodiment, the metal-organic framework mixture comprises between about 0.5 wt % to 10 wt % polyvinyl alcohol. The metal-organic framework mixture can comprise polyvinyl acetate and water. In an embodiment, the ratio of polyvinyl acetate to water is between about 1:1 to about 1:3.

The metal-organic framework extrudate can be shaped as a rod, a ribbed rod, a tablet, a ring, an annular tablet, a sphere, a pellet, a honeycomb body, or a granule. The metal-organic framework extrudate produced with the present methods can have a comparative BET surface area of about 40% to about 100%. In an embodiment, the metal-organic framework material is HKUST-1, UiO-66, ZIF-8, ZIF-7, MIL-100, MOF-74, MOF-274, or combination(s) thereof. In an embodiment, the metal-organic framework material has a pore size of from about 2 Å to about 50 Å. The metal-organic framework extrudate produced with the present methods can have a comparative BET surface area of about 40% to about 100%.

In an embodiment, the present methods further comprise the step of maturing the metal-organic framework extrudate at a temperature of about 20° C. to about 100° C. for a period of about 30 minutes or greater. In an embodiment, the present methods further comprise the step of activating the metal-organic framework extrudate at a temperature of about 100° C. to about 300° C. for a period of about 1 hour or greater. In an embodiment, the step of extruding the metal-organic framework extrudate is performed through a die with a diameter of about 0.01 mm to about 50 mm. In an embodiment, the metal-organic framework extrudate can be washed with an optional solvent

DETAILED DESCRIPTION

Figure 1:
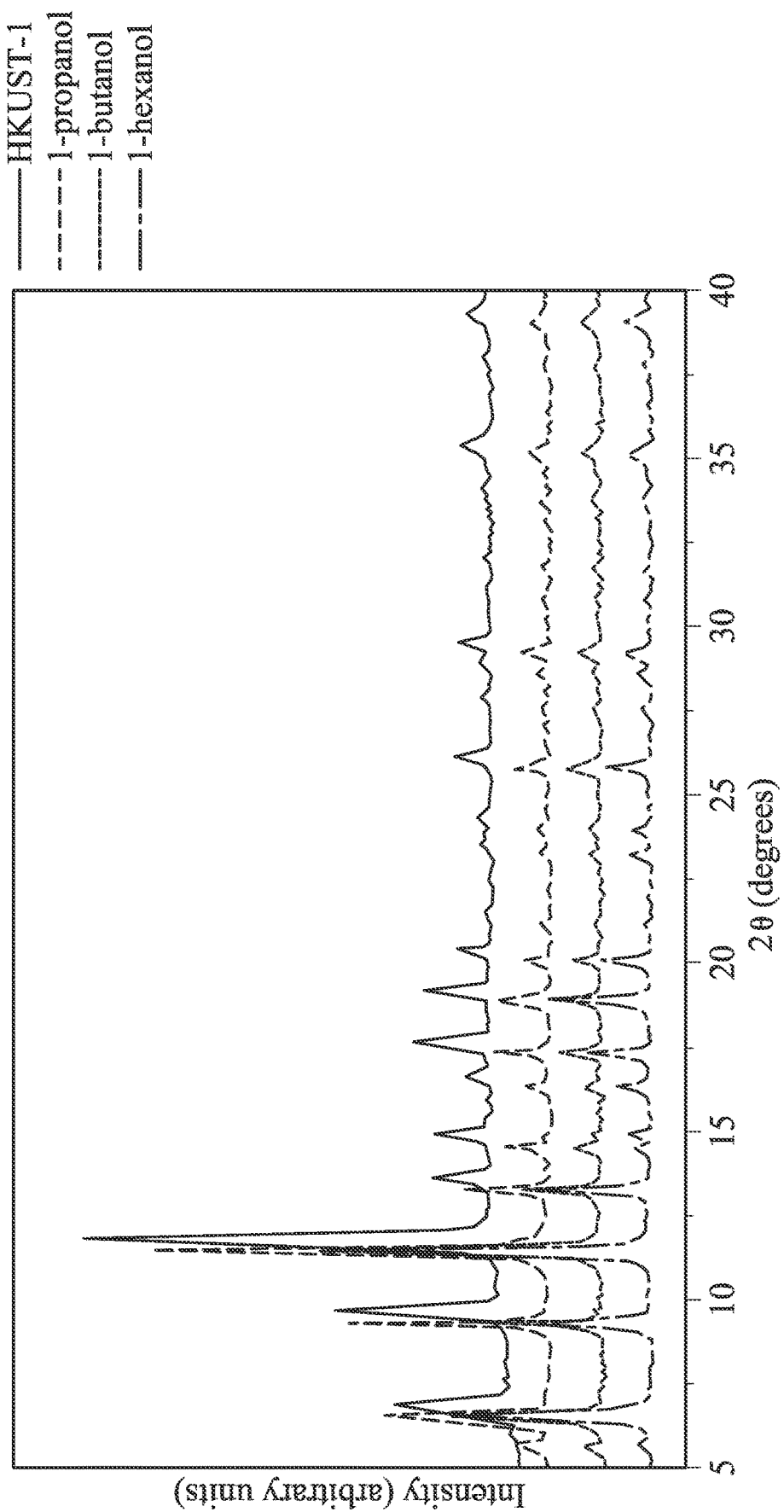
FIG. 1 are the powder x-ray diffraction ("PXRD") patterns of the HKUST-1 samples of Example 1 which were extruded with longer chain alcohols.

Before describing the extrudates and extrusion methods of the present disclosure in further detail, a listing of terms follows to aid in better understanding the present disclosure.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

For the sake of brevity, only certain ranges are explicitly disclosed herein. However, ranges from any lower limit can be combined with any upper limit to recite a range not explicitly recited, as well as, ranges from any lower limit can be combined with any other lower limit to recite a range not explicitly recited, in the same way, ranges from any upper limit can be combined with any other upper limit to recite a range not explicitly recited. Additionally, within a range includes every point or individual value between its end points even though not explicitly recited. Thus, every point or individual value can serve as its own lower or upper limit combined with any other point or individual value or any other lower or upper limit, to recite a range not explicitly recited.

As used in the present disclosure and claims, the singular forms "a," "an," and "the" include plural forms unless the context clearly dictates differently.

The term "and/or" as used in a phrase such as "A and/or B" herein is intended to include "A and B," "A or B," "A", and "B."

The term "aqueous medium" refers to a liquid comprising 5 vol. % water or greater. Suitable aqueous media may comprise or consist essentially of water or mixtures of water and a water-miscible organic solvent.

The term "extrusion" refers to the process of pushing a fluidized material ix through a die having a desired cross-section.

The term "extrudate" refers to an elongate body produced during extrusion.

The term "pre-crystallized" refers to a material, particularly a metal-organic framework material, that is previously synthesized (pre-formed) and typically separated from a reaction medium in which the material was formed.

The term "paste" refers to a solvated powder having a dough-like appearance and consistency.

As used herein, the terms, "metal organic-framework material" of "MOF material" refer to a metal or metalloid and an organic ligand capable of coordination with the metal or metalloid. In certain embodiments, MOF coordination networks of organic ligands and metals (or metalloids) form porous three-dimensional structures.

As used herein, the term "MOF extrudate" refers to the MOF material that has been extruded. The MOF extrudate comprises one or more metal organic-framework materials processed with at least one an extrusion aid, and can also include optional solvents and other additives such as binders, pore formers, lubricants, rheological auxiliaries and other materials (e.g., metal powders) which can contribute to stability.

Generally, metal-organic frameworks (MOFs) are a relatively new class of highly porous materials with potential applications in a wide range of fields including gas storage, gas and liquid separations, isomer separation, waste removal, and catalysis, among others. In contrast to zeolites, which are purely inorganic in character, MOFs utilize organic ligands which can function as "struts" bridging metal atoms or clusters of metal atoms together. Like zeolites, MOFs are microporous. The pore shape and size of the MOF can be tuned through selection of the organic ligands and metals. Because organic ligands can be modified, MOFs as a whole are structurally diverse which is different than zeolites. Factors that influence the structure of MOFs include, for example, one or more of ligand denticity, size and type of the coordinating group(s), additional substitution remote or proximate to the coordinating group(s), ligand size and geometry, ligand hydrophobicity or hydrophilicity, choice of metal(s) and/or metal salt(s), choice of solvent(s), and reaction conditions such as temperature, concentration, and the like.

MOFs are synthesized or obtained commercially as loose, unconsolidated microcrystalline powder materials. For many industrial and commercial products, shaping powder-form MOFs into larger, coherent bodies having a defined shape is desirable. Conventional methods of consolidating powder-form MOFs into large bodies, such as pelletizing and extrusion, have often times afforded less than desirable physical and mechanical properties. Specifically, processing of powder-form MOFs through compaction may result in BET surface areas that are considerably lower than those of the powder-form MOF due to pressure sensitivity of the MOF structure and crush strength can be relatively low. Further, the wrong processing conditions can lead to full or partial phase transformation of the initial MOF structure, as evidenced by x-ray powder diffraction and BET surface area analyses. Each of these factors can be problematic for producing MOF extrudates in the form of shaped bodies and/or using these shaped bodies in various applications.

While it is desirable to consolidate a metal-organic framework (MOF) powder material into a more coherent (shaped) body comprising a metal-organic framework material ("MOF material"), the properties of MOF materials, specifically their weakness against pressure and shear, may lead to various issues such as the intense pressures (e.g., about 100 psi to several thousand psi) and shear used to consolidate powder-form MOFs, particularly during extrusion, may collapse at least a portion of the pores within the MOF structure and lead to an undesirable and oftentimes significant decrease in BET surface area. Conditions used for consolidating powder-form MOFs into a shaped body can lead to at least partial and sometimes full conversion of the MOF structure into another material, such as another crystalline phase. Consolidated. MOFs (such as MOF extrudates) having poor crush strength can be problematic. For example, poor crush strength values can lead to production of fines, which may be detrimental to certain applications Therefore, the present disclosure provides methods of making MOF extrudates with decreased MOF deformation, increased MOF surface area and increased crush strength. The present methods combine one or more extrusion aids with the MOF material to produce the MOF extrudate. Extrusions aids useful in the present methods include one or more of a liquid extrusion aid, solid extrusion aid and/or polymeric extrusion aid.

Methods for producing the MOF extrudates of the present disclosure can involve agitating a mixture of a pre-crystallized MOF powder material (MOF material) and the extrusion aid to form a dough or paste that is suitable for extrusive processing. Agitation may occur by mulling in some instances. Mulling can be distinguished from milling in that mulling to does not apply a constant pressure and is gentler in terms of a lesser amount of force (energy) being applied during mixing. Mulling typically does not impart sufficient energy to the MOF to promote complete conversion of the MOF structure into another crystalline phase. Some MOFs are unstable toward input of even modest amounts of energy, and formation of a minor new crystalline phase can still occur even under the gentle mulling conditions disclosed herein.

The MOF materials disclosed herein may be characterized in terms of their porosity. The MOF materials may include micropores, mesopores, macropores and any combination thereof. Micropores are defined herein as having a pore size of about 2 nm or below, and mesopores are defined herein as having a pore size from about 2 nm to about 50 nm. Interparticle textural porosity may be present in some instances.

Desirably, MOF extrudates formed according to the disclosure herein retain at least a substantial majority of the BET surface area of the pre-crystallized metal-organic framework powder material from which they are formed. Specifically, the metal-organic framework material within the MOF extrudates may feature a BET surface area of about 50%, 60%, 70%, 80%, 90% or greater relative to the BET surface area of the pre-crystallized metal-organic framework powder material. Advantageously and surprisingly in some instances, the BET surface area of the metal-organic framework consolidated material within the extrudates may even be greater than the BET surface area of the pre-crystallized metal-organic framework powder material. Pelletized samples may feature similar BET surface areas of the metal-organic framework consolidated material.

As described herein, the MOF can be ZIFs (or Zeolitic Imidazolate Frameworks), MILs (or Matériaux de l'Institut Lavoisier), and IRMOFs (or IsoReticular Metal Organic Frameworks), alone or combination with other MOFs. In certain embodiments, the MOF is selected from: HKUST-1, MOF-74, MIL-100, ZIF-7, ZIF-8, ZIF-90, UiO-66, UiO-67, MOF-808 or MOF-274.

The MOF can be prepared via combination of an organic ligand, or one or a combination of two or more organic ligands, and a metal or metalloid as described below. For example, MOF-274 is a combination of $Mg^{2+}$, $Mn^{2+}$, $Fe^{2+}$, $Zn^{2+}$, $Ni^{2+}$, $Cu^{2+}$, $Co^{2+}$ or combinations thereof with 4,4'-dihydroxy-(1,1'-biphenyl)-3,3'-dicarboxylic acid. Additionally, MOF-274 can include amines coordinated to the metal sites within its structure.

As used herein, an "isotherm" refers to the adsorption of an adsorbate as function of concentration while the temperature of the system is held constant. In an embodiment, the adsorbate is $CO_2$ and concentration can be measured as $CO_2$ pressure. As described herein, isotherms can be performed with porous materials and using various mathematical models applied to calculate the apparent surface area. S. Brunauer, P. H. Emmett, and E. Teller. *J. Am. Chem. Soc.* 1938, 60, 309-319; K. Walton and R. Q. Snurr, *J. Am. Chem. Soc.* 2007, 129, 8552-8556; I. Langmuir, *J. Am. Chem. Soc.* 1916, 38, 2221.

Organic Ligands

As used herein, an organic ligand is a ligand that is monodentate, bidentate, or multi-dentate. The organic ligand can be a single type of ligand, or combination(s) thereof. Generally, the organic ligand is capable of coordination with the metal ion, in principle all compounds can be used which are suitable for such coordination. Organic ligands including at least two centers, which are capable to coordinate the metal ions of a metal salt, or metals or metalloids. In certain embodiments, an organic ligand includes: i) an alkyl group substructure, having from 1 to 10 carbon atoms, ii) an aryl group substructure, having from 1 to 5 aromatic rings, iii) an alkyl or aryl amine substructure, consisting of alkyl groups having from 1 to 10 carbon atoms or aryl groups having from 1 to 5 aromatic rings, where the substructures have at least two functional groups "X", which are covalently bound to the substructure, and where X is capable of coordinating to a metal or metalloid.

In certain embodiments, each X is independently selected from neutral or ionic forms of $CO_2H$, OH, SH, $NH_2$, CN, HCO, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, $CH(SH)_2$, $C(SH)_3$, $CH(NH_2)_2$, $C(NH_2)_2$, $CH(OH)_2$, $C(OH)_3$, $CH(CN)_2$, $C(CN)_3$, nitrogen-containing heterocycles, sulfur-containing heterocycles, and combination(s) thereof, where R is an alkyl group having from 1 to 5 carbon atoms, or an aryl group consisting of 1 to 2 phenyl rings.

In certain embodiments, the organic ligand include substituted or unsubstituted, mono- or polynuclear aromatic di-, tri- and tetracarboxylic acids and substituted or unsubstituted, at least one hetero atom including aromatic di-, tri- and tetracarboxylic acids, which have one or more nuclei.

In certain embodiments, the organic ligand is benzenetricarboxylate (BTC) (one or more isomers), ADC (acetylene dicarboxylate), NDC (naphtalenedicarboxylate) (any isomer), BDC (benzene dicarboxylate) (any isomer), ATC (adamantanetetracarboxylate) (any isomer), BTB (benzenetribenzoate) (any isomer), MTB (methane tetrabenzoate), ATB (adamantanetribenzoate) (any isomer), biphenyl-4,4'-dicarboxylate, benzene-1,3,5-tris(1H-tetrazole), imidazole, or derivatives thereof, or combination(s) thereof.

Ligands which possess multidentate functional groups can include corresponding counter cations, such as $H^+$, $Na^+$, $K^+$, $Mg^{2+}$, $Ca^{2+}$, $Sr^{2+}$, ammonium ion, alkylsubstituted ammonium ions, and arylsubstituted ammonium ions, or counteranions, such as $F^-$, $Cl^-$, $Br^-$, $I^-$, $ClO^-$, $Cl_2^-$, $ClO_3^-$, $ClO_4^-$, $OH^-$, $NO_3^-$, $NO_2^-$, $SO_4^{2-}$, $SO_3^{2-}$, $PO_4^{3-}$, and $CO_3^{2-}$.

In certain embodiments, the organic ligands include monodentate functional groups. A monodentate functional group is defined as a moiety bound to a substructure, which can include an organic ligand or amine ligand substructure, L, as defined previously, which can form only one bond to a metal ion. According to this definition, a ligand can contain one or more monodentate functional groups. For example, cyclohexylamine and 4,4'-bipyridine are ligands that contain monodentate functional groups, since each functional group is capable of binding to only one metal ion.

Accordingly, cyclohexylamine is a monofunctional ligand containing a monodentate functional group and 4,4'-bipyridine is a difunctional ligand containing two monodentate functional groups. Specific examples of ligands containing monodentate functional groups are pyridine, which is a monofunctional ligand, hydroquinone, which is a difunctional ligand, and 1,3,5-tricyanobenzene, which is a trifunctional ligand.

Ligands having monodentate functional groups can be blended with ligands that contain multidentate functional groups to make an MOF material in the presence of a suitable metal ion and optionally a templating agent. Monodentate ligands can also be used as templating agents. Templating agents can be added to the reaction mixture for the purpose of occupying the pores in the resulting MOF materials. Monodentate ligands and/or templating agents can include can include the following substances and/or derivatives thereof:

A. alkyl or aryl amines or phosphines and their corresponding ammonium or phosphonium salts, the alkyl amines or phosphines can include linear, branched, or cyclic aliphatic groups, having from 1 to 20 carbon atoms (and their corresponding ammonium salts), the aryl amines or phosphines can include 1 to 5 aromatic rings including heterocycles. Examples of monofunctional amines are methylamine, ethylamine, n-propylamine, iso-propylamine, n-butylamine, sec-butylamine, iso-butylamine, tert-butylamine, n-pentylamine, neo-pentylamine, n-hexylamine, pyrrolidine, 3-pyrroline, piperidine, cyclohexylamine, morpholine, pyridine, pyrrole, aniline, quinoline, isoquinoline, 1-azaphenanthrene, and 8-azaphenanthrene. Examples of difunctional and trifunctional amines are 1,4-diaminocyclohexane, 1,4-diaminobenzene, 4,4'-bipyridyl, imidazole, pyrazine, 1,3,5-triaminocyclohexane, 1,3,5-triazine, and 1,3,5-triaminobenzene.

B. Alcohols that contain alkyl or cycloalkyl groups, containing from 1 to 20 carbon atoms, or aryl groups, containing from 1 to 5 phenyl rings. Examples of monofunctional alcohols are methanol, ethanol, n-propanol, iso-propanol, allyl alcohol, n-butanol, iso-butanol, sec-butanol, tert-butanol, n-pentanol, iso-pentanol, sec-pentanol, neo-pentanol, n-hexanol, cyclohexanol, phenol, benzyl alcohol, and 2-phenylethanol. Examples of difunctional and trifunctional alcohols are 1,4-dihydroxycyclohexane, hydroquinone, catechol, resorcinol, 1,3,5-trihydroxybenzene, and 1,3,5-trihydroxycyclohexane.

C. Ethers that contain alkyl or cycloalkyl groups, containing from 1 to 20 carbon atoms, or aryl groups, containing from 1 to 5 phenyl rings. Examples of ethers are diethyl ether, furan, and morpholine.

D. Thiols that contain alkyl or cycloalkyl groups, containing from 1 to 20 carbon atoms, or aryl groups, containing from 1 to 5 phenyl rings. Examples of monofunctional thiols are thiomethane, thioethane, thiopropane, thiocyclohexane, thiophene, benzothiophene, and thiobenzene. Examples of difunctional and trifunctional thiols are 1,4-dithiocyclohexane, 1,4-dithiobertzene, 1,3,5-trithiocyclohexane, and 1,3,5-trithiobenzene.

E. Nitriles that contain alkyl or cycloalkyl groups, containing from 1 to 20 carbon atoms, or aryl groups, containing from 1 to 5 phenyl rings. Examples of monofunctional nitriles are acetonitrile, propanenitrile, butanenitrile, n-valeronitrile, benzonitrile, and p-tolunitrile. Examples of difunctional and trifunctional nitriles are 1,4-dinitrilocyclohexane, 1,4-dinitrilobenzene, 1,3,5-trinitrilocyclohexane, and 1,3,5-trinitrilobenzene.

F. Inorganic anions from the group consisting of: sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, thiocyanide and isonitrile, and the corresponding acids and salts of the aforementioned inorganic anions.

G. Organic acids and the corresponding anions (and salts). The organic acids can include alkyl organic acids containing linear, branched, or cyclic aliphatic groups, having from 1 to 20 carbon atoms, or aryl organic acids and their corresponding aryl organic anions and salts, having from 1 to 5 aromatic rings which can include heterocycles.

H. Other organic and inorganics such as ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine or trifluoromethylsulfonic acid.

Additionally, templating agents can include other aliphatic and aromatic hydrocarbons not containing functional groups. In certain embodiments, templating agents include cycloalkanes, such as cyclohexane, adamantane, or norbornene, and/or aromatics, such as benzene, toluene, or xylenes.

The Metal Ions

As described above, the MOF can be synthesized (made) by combining metal ions, organic ligands, and optionally a suitable templating agent. Suitable metal ions include metals and metalloids of varying coordination geometries and oxidation states. In certain embodiments, MOFs are produced using metal ions having distinctly different coordination geometries, in combination with a ligand possessing multidentate functional groups, and a suitable templating agent. MOFs can be prepared using a metal ion that prefers octahedral coordination, such as cobalt (II), and/or a metal ion that prefers tetrahedral coordination, such as zinc (II). MOF materials can be made using one or more of the following metal ions: $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $CO^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Ph^{2+}$, $As^{5+}$, $As^{3+}$, $As^{+}$, $Sb^{5+}$, $Sb^{3+}$, $Sb^{+}$, and $Bi^{5+}$, $Bi^{3+}$, $Bi^{+}$, $Be^{2+}$; along with the corresponding metal salt counterion. The term metal ion refers to both metal and metalloid ions.

In certain embodiments, metal ions suitable for use in production of MOF materials can include: $Sc^{3+}$, $Ti^{4+}$, $V^{4+}$, $V^{3+}$, $V^{2+}$, $Cr^{3+}$, $Mo^{3+}$, $Mg^{2+}$, $Mn^{3+}$, $Mn^{2+}$, $Fe^{3+}$, $Fe^{2+}$, $Ru^{3+}$, $Ru^{2+}$, $Os^{3+}$, $Os^{2+}$, $Co^{3+}$, $CO^{2+}$, $Rh^{2+}$, $Rh^{+}$, $Ir^{2+}$, $Ir^{+}$, $Ni^{2+}$, $Ni^{+}$, $Pd^{2+}$, $Pt^{2+}$, $Pt^{+}$, $Cu^{2+}$, $Cu^{+}$, $Ag^{+}$, $Au^{+}$, $Zn^{2+}$, $Cd^{2+}$, $Al^{3+}$, $Ga^{3+}$, $In^{3+}$, $Ge^{4+}$, $Ge^{2+}$, $Sn^{4+}$, $Sn^{2+}$, $Pb^{4+}$, $Pb^{2+}$, $Sb^{5+}$, $Sb^{3+}$, $Sb^{+}$, and/or $Bi^{5+}$, $Bi^{3+}$, Bit, $Be^{2+}$; along with the corresponding metal salt counteranion. In certain embodiments, metal ions for use in production of MOF materials include: $Sc^{3+}$, $Ti^{4+}$, $V^{4+}$, $V^{3+}$, $Cr^{3+}$, $Mo^{3+}$, $Mn^{3+}$, $Mn^{2+}$, $Fe^{3+}$, $Fe^{2+}$, $Co^{3+}$, $Co^{2+}$, $Ni^{2+}$, $Ni^{+}$, $Cu^{2+}$, $Cu^{+}$, $Ag^{+}$, $Zn^{2+}$, $Cd^{2+}$, $Al^{3+}$, $Sn^{4+}$, $Sn^{2+}$, and/or $Bi^{5+}$, $Bi^{3+}$, $Bi^{+}$; along with the corresponding metal salt counterion. In certain embodiments, the metal ions for use in production of MOF materials are selected from the group consisting of: $Mg^{2+}$, $Mn^{3+}$, $Mn^{2+}$, $Fe^{3+}$, $Fe^{2+}$, $Co^{3+}$, $Co^{2+}$, $Ni^{2+}$, $Ni^{+}$, $Cu^{2+}$, $Cu^{+}$, $Pt^{2+}$, $Ag^{+}$, $Zn^{2+}$, along with the corresponding metal salt counterion.

Production of MOF Materials

The synthesis of the rigid and stable MOF materials can be carried out under extremely mild reaction conditions. In most cases, the reagents are combined into a solution, either aqueous or nonaqueous, with synthetic reaction temperatures ranging from 0° C. to 100 C (in an open beaker). In other cases, solution reactions are carried out in a closed vessel at temperatures from 25° C. to 300° C. In either case, large single crystals or microcrystalline microporous solids are formed.

In the preparation of the MOF materials, the reactants can be added in a mole ratio of 1:10 to 10:1 metal ion to ligand containing multidentate functional groups. In certain embodiments, the metal ion to ligand containing multidentate functional groups is 1:3 to 3:1, such as from 1:2 to 2:1. The amount of templating agent can not affect the production of MOF materials, and in fact, templating agent can in certain circumstances be employed as the solvent in which the reaction takes place. Templating agents can accordingly be employed in great excess without interfering with the reactions and the preparation of the MOF materials. Additionally, when using a ligand containing monodentate functional groups in combination with the metal ion and the ligand containing multidentate functional groups, the ligand containing monodentate functional groups can be utilized in excess. In certain circumstances the ligand containing monodentate functional groups can be utilized as the solvent in which the reaction takes place. In addition, in certain circumstances the templating agent and the ligand containing monodentate functional groups can be identical. An example of a templating agent which is a ligand containing monodentate functional groups is pyridine.

The preparation of the MOF material can be carried out in either an aqueous or non-aqueous system. The solvent can be polar or nonpolar, and the solvent can be a templating agent, or the optional ligand containing a monodentate functional group. Examples of non-aqueous solvents include n-alkanes, such as pentane, hexane, benzene, toluene, xylene, chlorobenzene, nitrobenzene, cyanobenzene, aniline, naphthalene, naphthas, n-alcohols such as methanol, ethanol, n-propanol, isopropanol, acetone, 1,2,-dichloroethane, methylene chloride, chloroform, carbon tetrachloride, tetrahydrofuran, dimethylformamide, dimethylsulfoxide, thiophene, pyridine, ethanolamine, triethylamine, ethylenediamine, and the like. The appropriate solvent can be chosen based on solubility of the starting reactants, and the choice of solvent cannot be critical in obtaining the MOF material.

To aid in the formation of large single crystals of microporous materials, suitable for single crystal x-ray structural characterization, the solution reaction can be performed in the presence of viscous materials, such as polymeric additives. Specific additives can include polyethylene oxide, polymethylmethacrylic acid, silica gels, agar, fats, and collagens, which can aid in achieving high yields and pure crystalline products. The growth of large single crystals of microporous materials leads to unambiguous characterization of the microporous framework. Large single crystals of microporous materials can be useful for magnetic and electronic sensing applications.

Provided herein are methods of making MOF extrudates with the MOF material described above. In the present methods, the MOF material and an extrusion aid mixed together to form an MOF extrudate mixture. The MOF extrudate mixture is then extruded to form an MOF extrudate.

To form the MOF extrudate, an extruder can be a ram extruder (also referred to as an extrusion press, and a screw extruder. In the ram extruder, the MOF material is forced through a die by means of a plunger or piston which may be mechanically or hydraulically operated. In a screw extruder, the MOF material is transported from a feed point to the die by an auger or other type of turning screw. As described herein, after formation, the MOF extrudate can be dried and calcinated.

Generally, extruders are mechanical apparatuses used to produce extrudates having a defined cross-sectional profile. The extruder typically includes a hopper for delivering raw materials, a barrel or other confinement in which raw materials are combined and a die having a die opening through which the extrudate is formed. Within the barrel temperature, pressure, and shear forcibly homogenize materials which are passed through the die opening that can have various cross-sectional shapes. MOF extrudates can be shaped as rods or ribbed rods, tablets, rings, annular tablets, spheres, pellets, honeycomb bodies, granules or similar shaped bodies.

As described herein, MOF materials used in the present methods are combined with one or more extrusion aids, and optionally with an additive that can modify various physical properties of the extrudate. The additive can be combined with the MOF material prior to extrusion, or during extrusion. Exemplary extruders and extrusion processes for other types of extrudates are described in further detail in U.S. Pat. No. 4,441,990 at Col. 12, l. 23 to Col. 19, l. 64, incorporated herein by reference and in U.S. Pat. No. 6,517,807, at Col. 5, 1s. 35 to 50, incorporated herein by reference.

Extrusion processes in accordance with the present disclosure can include mixing or co-feeding a MOF material with one or more extrusion aids that enable extrusion of MOFs at lower operating pressures and/or the improve mechanical properties of MOF extrudates. Extrusion processes can be performed with or without an optional solvent or solvent mixture. In an aspect, MOF extrudates exhibit substantially the same or improved physical qualities of the original MOF material, and exhibit surface areas and mechanical strengths suitable for commercial applications. Extrusion aids include liquid extrusion aids, solid extrusion aids, and polymeric aids that reduce pressure during MOF extrusion and preserve or enhance structural properties such as crystallinity and porosity of the starting MOF material.

As used in the present methodologies and shown in the examples below, the extrusion aid is used to reduce pressure during the extrusion process and is also beneficial in maintaining specific operating pressures within limits on large scale extruders. In an embodiment, the extrusion aid can include materials that remain in the MOF extrudate, as well as those that do not remain in the MOF extrudate and are removed post-extrusion through washing and/or maturation. The extrusion aid can also improve the mechanical stability of a wide range of MOF materials having various metal nodes, pore structures, and crystallite sizes. As a result, the present methods are applicable to a variety of MOF crystallites and extrusion aid types. Overall, the extrusion aids as used in the present methodologies provides reduced MOF deformity during extrusion, increased surface area of the MOF extrudate, and increased crush strength of the MOF extrudate.

Extrusion Aids

As described herein, the present MOF extrudates comprise at least one MOF material and at least one extrusion aid. As provided herein, the extrusion aid can be a liquid extrusion aid, a solid extrusion aid, and/or a polymeric extrusion aid. In the present methods, extrusion aids serve to reduce pressure within the extruder and during the extrusion process, thereby minimizing or eliminating mechanical deformation and/or surface area reduction of the MOF material. Extrusion aids are used in the present methods to enable the production of MOF extrudates that could otherwise be damaged by extrusion.

Liquid Extrusion Aids

As provided herein, liquid extrusion aids include water, and linear and branched alkyl alcohols having an alkyl chain with at least 2 carbons. In an embodiment, liquid extrusion aids can include $C_3$ to $C_{10}$ alkyl alcohols, including 1-propanol, iso-propanol, 1-butanol, iso-butanol, 1-hexanol, 1-heptanol, and the like. In an embodiment, liquid extrusion aids having carbon numbers greater than $C_{10}$ can be used where the compounds remain liquid and combinable with MOF materials.

Methods for producing MOF extrudates include the step of mixing the MOF material with water alone, and/or with one or more extrusion aid to form a MOF extrudate mixture. Optionally, solvents can be used in lieu of water. In an embodiment, the MOF extrudate mixture can include water at a percent by volume (vol %) in a range of about 0.5 vol % to 95 vol %.

Solid Extrusion Aid

Solid extrusion aids can be graphite and clays such as montmorillonites, kaolins, bentonites, halloysites, dickites, nacrites, anauxites, and the like. Graphites can be characterized by a specific surface area $O_G$ (for example about 3 to 8 $m^2$/g or more) and a particle diameter $D_{50}$ of about 45 to 150 µm or less. $D_{50}$ means 50 percent of the particles are smaller than the value indicated. For the purposes of use in the present methods, graphite includes natural graphite, synthetic graphite and graphite modifications which encompass expanded graphite, graphite intercalation compounds and graphite nanofibers (GNF) or carbon nanotubes (CNT), and mixtures thereof. Graphite can be obtained with many different properties from many manufacturers and suppliers.

In an embodiment, solid extrusion aids can include $C_{10+}$ solid organic acids and salts thereof, such as magnesium stearate. Solid extrusion aids also comprise saturated and unsaturated $C_{10+}$ organic acids.

Solid extrusion aids can be combined with a MOF material at a percent by weight (wt %) in a range of about 0.5 wt % to about 30 wt %, about 1 wt % to about 40 wt %, and about 5 wt % to about 30 wt %.

Polymeric Extrusion Aid

The present methods of making the MOF extrudate can include the step of mixing the MOF material with one or more polymeric extrusion aids. The polymeric extrusion aid can be a polar polymer and include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Further examples of polymeric extrusion aids include polyesters, polyamides, ethylene vinyl acetate copolymers, polyvinyl chloride, polyvinyl alcohol (PVA), polyvinyl amine, or derivatives thereof. In an embodiment, the polymeric extrusion aid comprises polyvinyl alcohol or a derivative thereof, such as polyvinyl alcohol, polyvinyl acetate, polyvinyl butyrate, or polyvinyl propionate.

In an embodiment, the polymeric extrusion aid is a polymer blend of two or more polymers. Polymeric extrusion aids can include a mixture of polymers in which a first polymer is present at a percent by weight (wt %) of the polymer mixture in a range of about 10 wt % to about 99 wt %, such as 20 wt % to 95 wt %, 30 wt % to 90 wt %, 40 wt % to 90 wt %, or 50 wt % to 90 wt %, where the balance of the weight is a second polymer or a combination of polymers. In an embodiment, the polymeric extrusion aid comprises the polymer blend of polyvinyl alcohol and polyvinyl acetate.

The present methods of making MOF extrudate comprise the step of mixing the MOF material and one or more of the polymeric extrusion aid to form the MOF extrudate mixture. In embodiment, the MOF extrudate mixture can comprise at least polymer or the polymer blend. An optional solvent, and further optionally one or more polymeric extrusion aids, can be mixed with the MOF material and the polymeric extrusion aid. In an embodiment, the extrudate mixture can contain a ratio of polyvinyl acetate to water within a range of 1:1 to 1:3.

Blends of Extrusion Aids

Blends of extrusion aids ("extrusion aid blends") can be produced by mixing one or more polymers (as described above), by connecting reactors together in series to make reactor blends, or by using more than one catalyst in the same reactor to produce multiple species of polymer. For blends, two or more extrusion aids can be mixed together prior to being put into the extruder or can be mixed in an extruder prior to being mixed with the MOF material.

Extrusion aid blends can be formed using any suitable equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which can include a compounding extruder and a side-arm extruder used directly downstream of a polymerization process, which can include blending powders or pellets of the resins at the hopper of the film extruder.

Optional Additives

Additionally, additives can be included in the MOF extrudate. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc.

Other optional additives include silica, such as precipitated silica and silica originating from by-products such as fly-ash, for example silica-alumina, silica-calcium particles, or fumed silica. In certain embodiments, the silica is particulate matter and has an average particle size of 10 µm or less, such as 5 µm or less, or 1 µm or less. In an embodiment, the silica is amorphous silica.

Other additives include inorganic compounds, such as titanium dioxide, hydrated titanium dioxide, hydrated alumina or alumina derivatives, mixtures of silicon and aluminum compounds, silicon compounds, clay minerals, alkoxysilanes, and amphiphilic substances. Additives can also include any suitable compound use for adhesion of powdery materials, such as oxides, of silicon, of aluminum, of boron, of phosphorus, of zirconium and/or of titanium. Additionally, additives can include oxides of magnesium and of beryllium. Furthermore, tetraalkoxysilanes can be used as additives, such as tetramethoxysilane, tetraethoxysilane, tetrapropoxysilane and tetrabutoxysilane, the analogous tetraalkoxytitanium and tetraalkoxyzirconium compounds and trimethoxy-, triethoxy-, tripropoxy- and tributoxy-aluminum.

Additives can have a concentration between 0 wt % to about 40 wt %, and between about 20 wt % to about 40 wt % based on the total weight of the one or more extrusion aids.

Methods of Making an MOF Extrudate

As described herein, the present methods include the step of mixing a MOF material with an extrusion aid and, as an option, other additives to form an extrudate mixture. The present methods also include the step of extruding the extrudate mixture to form the MOF extrudate. The present methods of making MOF extrudates include production of granules, or shaped-bodies. As such, in certain embodiments, the MOF extrudate is formed and shaped or granulated to form granules or shaped-bodies.

The present methods can further include the step of washing the extrudate with an optional solvent and can include the steps of drying and/or calcining the MOF extrudate. The optional solvent can include water, alcohols, ketones, amides, esters, ethers, nitriles, aromatic hydrocarbons, aliphatic hydrocarbons, and combination(s) thereof. In certain embodiments, the optional solvent is selected from the group consisting of water, methanol, ethanol, dimethylformamide, acetone, diethylether, acetonitrile, and combination(s) thereof. In certain embodiments, the optional solvent is water. In certain embodiments, the optional solvent is a mixture of two or more solvents. The optional solvent can be used to wash the MOF material and/or MOF extrudate during different stages of the process.

The step of mixing can be performed in any suitable manner including, such as dry blending the individual components and subsequently melt mixing in a mixer, or mixing the components together directly in a mixer, such as, for example, a Banbury mixer, a Haake mixer, a Brabender internal mixer, high shear mixer, drum mixer, or a single or twin-screw extruder, which can include a compounding extruder and a side-arm extruder used directly downstream of a polymerization process, which can include blending powders or pellets of the MOF material at the hopper of the extruder. In certain embodiments, the steps of mixing and extruding are simultaneous, such as when the MOF material and the extrusion aid are mixed in the extruder and extruded. Alternatively, the MOF material and the extrusion aid are mixed with the optional solvent before extrusion.

The MOF material and the extrusion aid can be premixed as dry materials. The order of addition of the components (MOF material, extrusion aid, optional solvent) will be a function of the targeted material. It is possible either to add the extrusion aid, the MOF material, and optional solvent in any order, the most suitable order is determined by the type of mixers employed.

As described herein, the step of mixing can be accomplished by methods of materials processing and unit operations. If the mixing occurs in the liquid phase, stirring can be used, if the mass to be mixed is paste-like, kneading and/or extruding can be used. Solid components and powders can be combined in mixers. The use of atomizers, sprayers, diffusers or nebulizers is conceivable as well, if the state of the components to be used allows the use thereof. For MOF materials that are paste-like or powder-like the use of static mixers, planetary mixers, mixers with rotating containers, pan mixers, pug mills, shearing-disk mixers, centrifugal mixers, sand mills, trough kneaders, internal mixers, internal mixers and continuous kneaders can be desired. The mixing step can be sufficient to achieve the molding or extruding, such as when mixing and extruding coincide.

Further, the step of mixing can be continuous or batch processed. In the case where mixing is batch processed, the present methodologies can be carried out in a mixer equipped with Z arms, or with cams, or in another type of mixer, such as a planetary mixer. The step of mixing can provide a homogenous mixture of the pulverulent constituents. Mixing can take place for a duration of 5 to 60 min, such as 10 to 50 min and the maximum mixing time should be no longer than 60 minutes. The speed of rotation of the mixer arms can be 10 to 75 rpm, such as 25 to 50 rpm.

The MOF extrudate mixture can include from 1 wt % to 99 wt %, such as from 5 wt % to 99 wt %, from 7 wt % to 99 wt %, or from 10 wt % to 95 wt % of the MOF material; from 1 wt % to 99 wt %, such as from 1 wt % to 90 wt %, from 1 wt % to 50 wt %, or from 1 wt % to 20 wt % of the extrusion aid (including optional additives), and optionally from 0 wt % to 20 wt %, such as from 1 wt % to 15 wt %, from 1 wt % to 10 wt %, or from 1 wt % to 7 wt % of the optional solvent. The percentages by weight being expressed with respect to the total quantity of compounds and/or powders in the mixture and the sum of the quantities of each of the compounds and the powders in the mixture being equal to 100%. In certain embodiments, the MOF extrudate mixture includes from about 20 wt % to about 70 wt % solids, based on the total weight of the MOF extrudate mixture.

For the present methods, the step of extruding (the extrusion step) can take place in a single or twin-screw ram extruder. In the case where preparation of the MOF material is carried out continuously with extrusion, the mixing can be couple with extrusion in one or more pieces of equipment. According to this implementation, the extrusion of the MOF extrudate mixture, also called "kneaded paste", can be carried out either by extruding directly at the end of a continuous mixer of the twin-screw type for example, or by connecting one or more batch mixers to an extruder. The geometry of the die, which gives the extrudates their shape, can be selected from any suitable die, such as cylindrical, multilobed, grooved shape, or slitted.

Extrusion can be affected by the quantity of the extrusion aid together with any optional solvent added, and can be adjusted to obtain a mixture or a paste that does not flow and is not overly dry, so as to allow its extrusion under suitable conditions of pressure dependent on the extrusion equipment used. In certain embodiments, the extrusion is carried out at an extrusion pressure of about 0.1 MPa or more, such as from about 0.1 MPa to about 20 MPa, from about 2 MPa to about 15 MPa, or from about 3 MPa to about 10 MPa.

The MOF extrudate can include be pelletized and the product be in the form of the MOF extrudate or MOF extrudate pellets. However, it is not excluded that the MOF materials obtained are then, for example, introduced into equipment for rounding their surface, such as a tumbler or any other equipment for spheronization.

MOF extrudates can have a diameter from about 1 to about 10 mm, such as from about 1.5 to about 5 mm. In certain embodiments, the mixture is extruded through a die with a diameter of from about 0.01 mm to about 50 mm, such as from about 0.05 mm to about 40 mm, from about 0.1 mm to about 20 mm, from about 0.2 mm to about 10 mm, or from about 0.5 mm to about 7 mm. Such extrusion apparatuses are described, for example, in Ullmann's Enzylopäddie der Technischen Chemie, 4th Edition, Vol. 2, p. 295 et seq., 1972. In addition to the use of an extruder, an extrusion press can also be used.

MOF extrudates can also optionally undergo maturation, such as drying or setting the MOF extrudate. The maturation can include temperatures of about 0° C. to about 300° C., about 20° C. to about 200° C., or about 20° C. to about 150° C. The maturation can take place for a duration of about 1 min to about 72 h, such as about 30 min to about 72 h, about 1 h to about 48 h, or about 1 h to about 24 h. In certain embodiments, the maturation can be carried out in air or humidified air with a relative humidity of 20% to 100%, such as 70% to 100%. The treatment with humidified gas can allow for hydration of the material, which can be beneficial to setting certain extrusion aids. In certain embodiments, the maturation can be carried out in air or inert gas that is dehumidified, such as air with a relative humidity of 0% to 10%, or of 0% to 5%.

The MOF extrudate or matured MOF extrudate can also optionally undergo activation. Activation can take place at temperatures of about 50° C. to about 500° C., such as about 100° C. to about 300° C. Activation can take place for a duration of about 1 hour ("h") to about 6 h, such as about 1 h to about 4 h. Activation can aid in removal of solvent used for facilitating the extruding of the mixture. The activation can take place in air, inert gas, or a mixture containing oxygen. Additionally, activation can take place at reduced or increased pressure, such as in vacuo or pressures greater than atmospheric pressure. In certain embodiments, the extrudates are calcined under dry air or air with different levels of humidity or they are heat-treated in the presence of a gas mixture including an inert gas, such as nitrogen and/or oxygen. In certain embodiments, the gas mixture used can include 5 vol % or more, such as 10 vol % or more oxygen. In alternative embodiments, the gas mixture is free of or substantially free of oxygen and include only inert gases. The calcination temperature can be from about 50° C. to about the degradation temperature of the MOF material.

Properties of MOF Extrudates

MOF extrudate prepared with the present methods can have a bulk crush strength of from about 0.2 lb-force to about 80 lb-force, such as about 0.4 lb-force to about 50 lb-force, from about 1 lb-force to about 20 lb-force, or from about 4 lb-force to about 15 lb-force. The crush strength can be related to the extrudate size and extrudates can have a shaped body that extends to about 1 mm or more in each direction in space. The bulk crush strength is a standardized test (ASTM D7084-04).

The MOF extrudate prepared with the present methods can have a BET surface area (measured using ASTM D3663) of about 50 $m^2/g$ to about 4,000 $m^2/g$, about 50 $m^2/g$ to about 3,000 $m^2/g$, about 50 $m^2/g$ to about 2,000 $m^2/g$, about 100 $m^2/g$ to about 1,800 $m^2/g$, about 100 $m^2/g$ to about 1,700 $m^2/g$, about 100 $m^2/g$ to about 1,600 $m^2/g$, about 100 $m^2/g$ to about 1,550 $m^2/g$, about 100 $m^2/g$ to about 1,500 $m^2/g$, about 100 $m^2/g$ to about 1,450 $m^2/g$, about 100 $m^2/g$ to about 1,400 $m^2/g$, about 100 $m^2/g$ to about 1,300 $m^2/g$, about 100 $m^2/g$ to about 1,250 $m^2/g$, about 100 $m^2/g$ to about 1,200 $m^2/g$, about 100 $m^2/g$ to about 1,150 $m^2/g$, about 100 $m^2/g$ to about 1,100 $m^2/g$, about 100 $m^2/g$ to about 1,050 $m^2/g$, about 100 $m^2/g$ to about 1,000 $m^2/g$, about 100 $m^2/g$ to about 900 $m^2/g$, about 100 $m^2/g$ to about 850 $m^2/g$, about 100 $m^2/g$ to about 800 $m^2/g$, about 100 $m^2/g$ to about 700 $m^2/g$, about 100 $m^2/g$ to about 600 $m^2/g$, about 100 $m^2/g$ to about 550 $m^2/g$, about 100 $m^2/g$ to about 500 $m^2/g$, about 100 $m^2/g$ to about 450 $m^2/g$, about 100 $m^2/g$ to about 400 $m^2/g$, about 100 $m^2/g$ to about 300 $m^2/g$, about 100 $m^2/g$ to about 200 $m^2/g$, about 300 $m^2/g$ to about 1,800 $m^2/g$, about 300 $m^2/g$ to about 1,700 $m^2/g$, about 300 $m^2/g$ to about 1,600 $m^2/g$, about 300 $m^2/g$ to about 1,550 $m^2/g$, about 300 $m^2/g$ to about 1,500 $m^2/g$, about 300 $m^2/g$ to about 1,450 $m^2/g$, about 300 $m^2/g$ to about 1,400 $m^2/g$, about 300 $m^2/g$ to about 1,300 $m^2/g$, about 300 $m^2/g$ to about 1,250 $m^2/g$, about 300 $m^2/g$ to about 1,200 $m^2/g$, about 300 $m^2/g$ to about 1,150 $m^2/g$, about 300 $m^2/g$ to about 1,100 $m^2/g$, about 300 $m^2/g$ to about 1,050 $m^2/g$, about 300 $m^2/g$ to about 1,000 $m^2/g$, about 300 $m^2/g$ to about 900 $m^2/g$, about 300 $m^2/g$ to about 850 $m^2/g$, about 300 $m^2/g$ to about 800 $m^2/g$, about 300 $m^2/g$ to about 700 $m^2/g$, about 300 $m^2/g$ to about 600 $m^2/g$, about 300 $m^2/g$ to about 550 $m^2/g$, about 300 $m^2/g$ to about 500 $m^2/g$, about 300 $m^2/g$ to about 450 $m^2/g$, or about 300 $m^2/g$ to about 400 $m^2/g$. In particular, the MOF extrudate can have a total BET surface area of about 300 $m^2/g$ to about 4,000 $m^2/g$, such as from about 500 $m^2/g$ to about 1,600 $m^2/g$.

Additionally, the MOF extrudate prepared with the present methods can have a comparative BET surface area of about 30% to about 100%, such as from about 50% to about 95%, or from about 70% to about 90% (measured using ASTM D3663) of the pristine MOF. A comparative BET surface area is defined as the BET surface area of the MOF extrudate divided by the BET surface area of the MOF material. For example, if a MOF extrudate is prepared using HKUST-1 and the extrudate has a BET surface area of 1292 $m^2/g$, then the MOF extrudate would have an 80% comparative BET surface area because 1292 $m^2/g$ is 80% of 1615 $m^2/g$ (the calculated BET surface area of HKUST-1).

The MOF extrudate prepared with the present methods can have a pore volume (measured using ASTM D3663) of about 0 $cm^3/g$ to about 1.6 $cm^3/g$, about 0.2 $cm^2/g$ to about 1.6 $cm^3/g$, about 0.2 $cm^2/g$ to about 1.5 $cm^3/g$, about 0.2 $cm^3/g$ to about 1.4 $cm^3/g$, about 0.2 $cm^3/g$ to about 1.3 $cm^3/g$, about 0.3 $cm^3/g$ to about 1.2 $cm^3/g$, about 0.3 $cm^3/g$ to about 1.1 $cm^3/g$, about 0.4 $cm^3/g$ to about 1.1 $cm^3/g$, or about 0.4 $cm^3/g$ to about 1 $cm^3/g$. A MOF extrudate can have a porosity of about 30% to about 100%, such as from about 50% to about 95%, or from about 70% to about 90% (measured using ASTM D3663) of the pristine MOF material.

The MOF extrudate prepared with present methods can have an average pore diameter size of about 1 Å to about 40 Å, such as from about 2 Å to about 25 Å, or from about 6 Å to about 23 Å (measured using ASTM D4365).

Applications

The MOF extrudate can be used for applications in catalysis, separation, purification, capture, etc. For example, the MOF extrudate can be brought into contact with the gaseous feedstock to be treated in a reactor, which can be either a fixed-bed reactor, or a radial reactor, or a fluidized-bed reactor or an adsorbent bed. In the case of an application in the areas of catalysis and separation, the expected value of ACS is greater than 0.9 daN/mm, such as greater than 1 daN/mm. Therefore, the MOF extrudates described have sufficient mechanical strength to be used in areas of catalysis and separation.

The MOF extrudates can be used in processes where a porous body or a body with channels provides an advantage over solid bodies or powders. In particular, such applications include: catalysts, support for catalysts, sorption, storage of fluids, desiccants, ion exchanger materials, molecular sieves (separators), materials for chromatography, materials for the selective release and/or uptaking of molecules, molecular recognition, nanotubes, nano-reactors.

In certain embodiments of applications, the MOF extrudates are used as catalysts in fixed bed/packed bed reactors. In principle, the MOF extrudates can be used in gas phase reactions or in liquid phase reactions, in which case the solid shaped bodies are suspended in a slurry. Additionally, the MOF extrudates can be used to catalyze various reactions where the presence of channels and/or pores incorporated therein are known or believed to increase the activity and/or selectivity and/or yield of the reaction.

Another application is the storage of compounds, especially of gaseous compounds. The pore size and porosity of the MOF extrudate can allow for excellent storage or sequestration of gaseous compounds, such as $CO_2$, $CH_4$, or $H_2$, and separations of gases, all of which are of particular interest in the energy industry.

The features of the invention are described in the following non-limiting examples below.

Example

The metal-organic framework, HKUST-1 ($Cu_3btc_2$, where btc is 1,3,5-benzenetricarboxylate) was used and prepared in a mull mix with water and one of several of liquid extrusion aids, alkyl alcohols: 1-propanol, 1-butanol, and 1-hexanol. Ethanol was used as a comparative alcohol additive.

1-propanol was mixed with water and then added to the extrusion mull mix (referred to herein as MOF material), while 1-butanol and 1-hexanol were not water-soluble and added separately. All experiments were done with a 1:1 water:alcohol ratio. All mull mixes were extruded at 43% solids in the Ram extruder (colloquially known as the high temperature melt extruder (HTME)). P1, P2, and P3 are the pressures measured during extrusion at the beginning, middle, and end of the extrusion. The results of these experiments are shown in Table 1 below, a demonstration of pressure reduction during extrusion by using longer chain alcohols as the extrusion aid, specifically the liquid extrusion aid.

TABLE 1

Pressure Reduction During Extrusion with Alcohols as the Extrusion Aid

| Liquid Extrusion Aid | P1 (psi) | P2 (psi) | P3 (psi) | BET Surface Area ($m^2/g$) | Crush Strength ($lb_{force}/in$) |
| --- | --- | --- | --- | --- | --- |
| 1-propanol | 2250 | 3050 | 5740 | 1601 | 49.7 |
| 1-butanol | 2870 | 4260 | 6280 | 1450 | 56.2 |
| 1-hexanol | 1570 | 2170 | 3580 | 717 | 28.0 |
| ethanol (comparative) | 3260 | 4300 | 6820 | 1679 | 75.9 |

As provided in Table 1, all three alcohols show that the pressure is reduced relative to the using ethanol, with 1-hexanol being particularly notable in this pressure reduction. The longer carbon chains on the longer alcohols seem to provide more lubrication during the extrusion process, which leads to these lower pressures.

Figure 2:
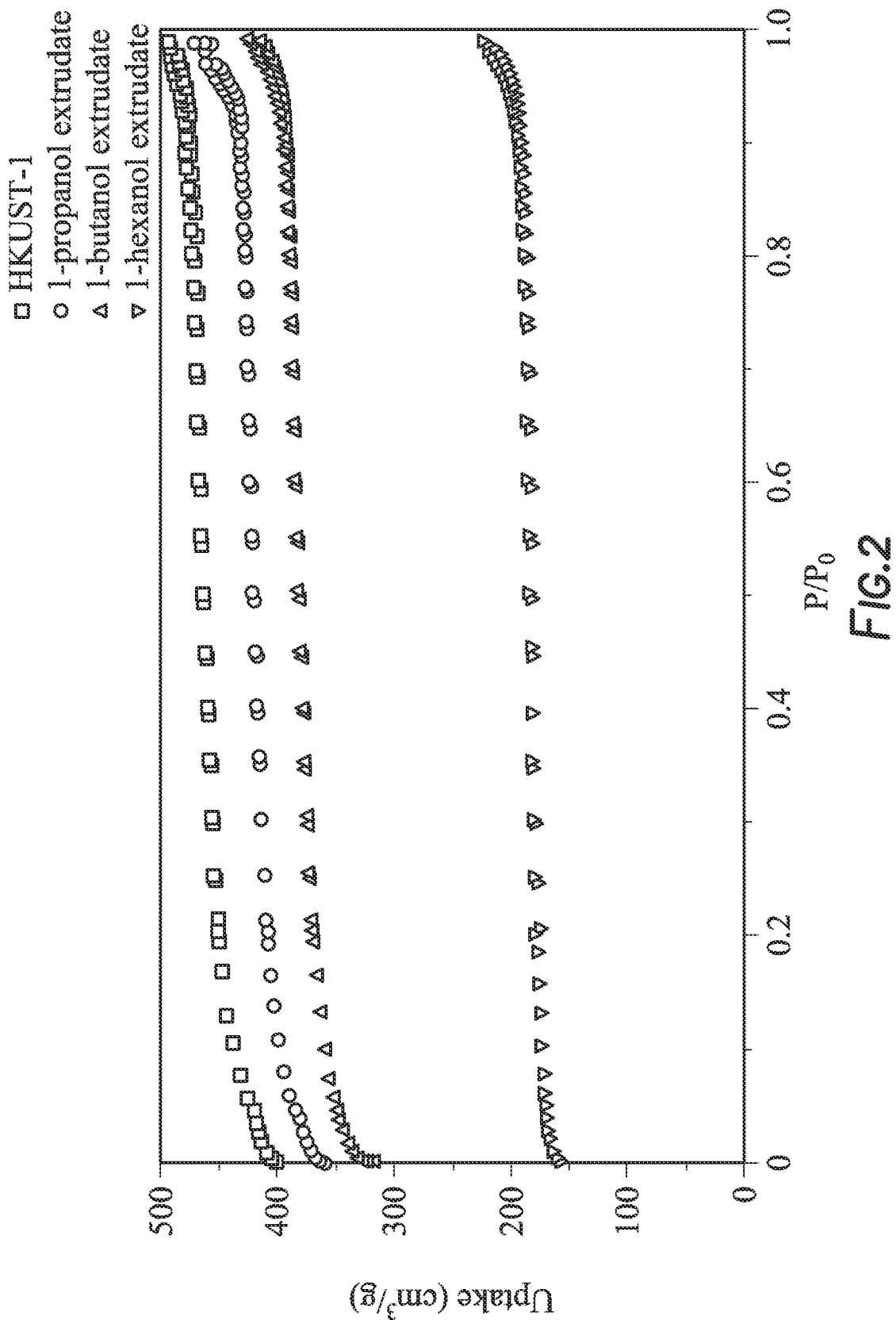
FIG. 2 shows the $N_2$ adsorption isotherms of HKUST-1 samples of Example 1 extruded with longer chain alcohols.

FIG. 1 shows the retention of crystallinity of the MOF, HKUST-1 after extrusion with each of the longer-chain alcohols, while FIG. 2 demonstrates the $N_2$ adsorption isotherms used to determine the BET surface areas of each of the extruded materials.

Further reductions in pressure during extrusion were achieved using graphite as the extrusion aid. Like long chain alcohols, this solid extrusion aid can reduce pressure during extrusion. Specifically, graphite (<20 µm) was tested as a lubricant in pelletization, in which pellets with 2% and 20% graphite were each pressed at 500 and 1000 psi. The resulting surface areas were determined compared to the HKUST-1 powder surface area and weighted to account for the lack of surface area in graphite. When mixing, the graphite appeared to coat the outer surface of the HKUST-1 particles. A comparison of the BET surface area values is provided in Table 2 immediately below.

TABLE 2

Pelletization of HKUST-1 with Graphite Surface Area Under Various Pressures

| Pressure (psi) | Graphite (wt % of solids) | BET Surface Area ($m^2/g$) | % HKUST-1 surface area retained |
| --- | --- | --- | --- |
| 500 | 2 | 1635 | 94.4 |
| 1000 | 2 | 1427 | 82.4 |
| 500 | 20 | 1241 | 87.8 |
| 1000 | 20 | 2000 | 84.9 |

In Table 2, the graphite percentages represent the weight percent of the weight of the total solids. For example, 2 wt % graphite means that 2% of the solids were graphite and 98% of the solids were HKUST-1 powder or the MOF material.

Based on the success of the pelletization experiments, HKUST-1 was extruded with graphite to observe pressure changes as a function of the amount of graphite (GJM-2016-33584, MTK-026). Samples were extruded through the 1/16" cylinder die on the HTME hand press. The 2% graphite sample did not reduce the pressure of the extrusion process and retained most of the HKUST-1 surface area. The inclusion of 20% graphite substantially reduced the pressure. Also, this is significantly lower than the pressure required for the same solids content without graphite (GJM-2016-33396, MTK-017). Furthermore, the surface area of 1327 $m^2/g$, when weighted to account for the graphite, exhibits 94% retention of surface area, indicating that the graphite is not blocking the pores of the HKUST-1 material. It appears that 20 wt. % or less of graphite can reduce pressure in the extruder while retaining the properties of the metal-organic framework in the extrudate.

Another extrusion aid tested was polyvinyl alcohol, or PVA. PVA was used as the polymeric extrusion aid in the extrusion of both ZIF-8 and HKUST-1. By adding small percentages of polyvinyl alcohol with polyvinyl acetate as a binder, the crush strength was shown to improve. For example, the crush strength of HKUST-1 was improved from 53 to 213 lb/in with the addition of 2 wt % polyvinyl alcohol, yielding an important retention of surface area as well compared with the same extrusion without polyvinyl alcohol. Table 4 immediately below shows crush strength and BET surface area of these two metal-organic frameworks (PVA: polyvinyl alcohol, PVAc/DI: polyvinyl acetate/deionized water (w/w)). The crush strength of the MOF extrudates were measured in accordance with ASTM D7084 on a Varian VK200. BET surface was measured in accordance with ASTM D3663.

TABLE 4

Crush Strength and BET Surface Area of ZIF-8 and HKUST-1

| MOF | PVAc/DI Ratio | PVA (wt %) | Crush Strength ($lb_{force}/in$) | BET Surface Area ($m^2/g$) |
| --- | --- | --- | --- | --- |
| ZIF-8 | 50/50 | 0 | 53 | 978 |
| ZIF-8 | 25/75 | 3 | 134 | 1190 |
| HKUST-1 | 25/75 | 0 | 105 | 626 |
| HKUST-1 | 25/75 | 0 | 53 | 660 |
| HKUST-1 | 25/75 | 2 | 213 | 905 |

Extrusions with polyvinyl alcohol (PVA) demonstrate significantly higher crush strength than those without PVA. PVA as an extrusion aid can help improve crush strength while simultaneously allowing for improved mechanical stability. Additionally, the inclusion of extrusion aids does not negatively affect the crystallinity or the surface area of the MOF material, as demonstrated with a variety of extrusion aids and a variety of MOF materials having different metal nodes, pore sizes, and crystalline structures. Different types of extrusion aids for MOF materials are provided in this disclosure. The common thread between them is that each extrusion aid enables extrusion of MOF materials by maintaining the quality and porosity of the MOF material while also producing MOF extrudates having sufficient quality for use in industrial applications. For certain MOFs, extrusion with a mixture of water and ethanol is required to mitigate heat of adsorption induced degradation of the MOF upon exposure to liquid water. As described above, ethanol was replaced with longer chain alcohols, which offer similar benefits to ethanol but also reduce pressure buildup during the extrusion. Pressure reduction is crucial to maintaining the MOF crystallinity and porosity during exposure to high pressures in extrusion of MOF materials. Furthermore, pressure limits on the larger screw extruders that are used to manufacture catalyst extrudates at scale require reduced pressure during extrusion.

As noted above, extrusion of metal-organic frameworks is a relatively unexplored field, but one that is required to formulate these new materials for use in various applications. Due to their lack of rigidity, MOFs can be damaged from the high pressure and temperature experienced in the conditions in which the MOF is exposed to during the extrusion process. Furthermore, binders are often required to improve the mechanical strength of the resulting extrudates. However, many binders are incompatible with MOFs, primarily based on a lack of compatible surfaces. Therefore, we provide herein methods to make the MOF extrudates with different extrusion aids that reduce pressure during extrusion to preserve the structural integrity of the MOF material as well as improve the mechanical strength of the MOF extrudates. Interestingly, improvements in pressure reduction can be achieved both through the use of solvents that do not remain in the final extrudate, as well as solid extrusion aids that do remain in the final extrudate. Use of the extrusion aid provides a novel approach not previously been addressed.

The invention claimed is:

1. A method of making a metal-organic framework extrudate in an extruder comprising the steps of:
    mixing a metal-organic framework material with a polymeric extrusion aid to form a metal-organic framework extrudate mixture, the metal-organic extrudate mixture a) comprising a solvent that consists essentially of water, or b) being substantially free of solvent; and
    extruding the metal-organic framework mixture in the extruder to produce the metal-organic framework extrudate, wherein pressure within the extruder is reduced between about 10% to about 55% when compared to pressure within the extruder when extruding the metal-organic framework material without the extrusion aid,
    wherein the polymeric extrusion aid is a polyvinyl amide, a polyacrylate, a polycarbonate, a polyamide, a polyester, a polyether, a polyvinyl amine, a polyvinyl alcohol, a polyvinyl ester, or a combination thereof.

2. The method of claim 1, wherein the polymeric extrusion aid is polyvinyl alcohol.

3. The method of claim 2, wherein the metal-organic framework mixture comprises between about 0.5 wt % to 10 wt % polyvinyl alcohol.

4. The method of claim 1, wherein the metal-organic framework mixture comprises polyvinyl acetate and water, and the ratio of polyvinyl acetate to water is between about 1:1 to about 1:3.

5. The method of claim 1, wherein the metal-organic framework extrudate is shaped as a rod, a ribbed rod, a tablet, a ring, an annular tablet, a sphere, a pellet, a honeycomb body, or a granule.

6. The method of claim 1, wherein the metal-organic framework material is selected from the group consisting of HKUST-1, UiO-66, ZIF-7, MIL-100, MOF-74, $M_2$(m-dobdc), MOF-274, Cu(Qc)$_2$ and combination(s) thereof.

7. The method of claim 1, wherein the metal-organic framework material comprises an organic ligand comprising one or more of:
    an alkyl group substructure having from 1 to 10 carbon atoms; or
    an aryl group substructure having from 1 to 5 aromatic rings,
    wherein the one or more substructures each have at least two X groups, and
    wherein X is a functional group configured to coordinate to a metal or metalloid.

8. The method of claim 7, where each X is independently selected from the group of neutral or ionic forms of $CO_2H$, $OH$, $SH$, $OH_2$, $NH_2$, $CN$, $HCO$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, $CH(SH)_2$, $C(SH)_3$, $CH(NH_2)_2$, $C(NH_2)_2$, $CH(OH)_2$, $C(OH)_3$, $CH(CN)_2$, $C(CN)_3$, nitrogen-containing heterocycles, sulfur-containing heterocycles, and combination(s) thereof, wherein R is an alkyl group having from 1 to 5 carbon atoms or an aryl group consisting of 1 to 2 phenyl rings.

9. The method of claim 1, wherein the organic ligand is selected from the group of 1,3,5-benzenetricarboxylate, 1,4-benzenedicarboxylate, 1,3-benzenedicarboxylate, biphenyl-4,4'-dicarboxylate, benzene-1,3,5-tris(1H-tetrazole), acetylene-1,2-dicarboxylate, naphtalenedicarboxylate, adamantanetetracarboxylate, benzenetribenzoate, methanetetrabenzoate, adamantanetribenzoate, biphenyl-4,4'-dicarboxylate, imidazole, 2,5-dihydroxy-1,4-benzendicarboxylic acid, 4,4'-dihydroxy-(1,1'-biphenyl)-3,3'-dicarboxylic acid derivatives thereof, and combination(s) thereof.

10. The method of claim 1, wherein the metal-organic framework material comprises a metal ion selected from the group of $Be^{2+}$, $Mg$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^{2+}$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, and $Bi^{5+}$, $Bi^{3+}$, $Bi^+$, and combination(s) thereof.

11. The method of claim 1, wherein the metal-organic framework extrudate has a comparative BET surface area of about 40% to about 100% relative to the metal-organic framework material and prior to extrusion.

12. The method of claim 1, further comprising the step of maturing the metal-organic framework extrudate at a temperature of about 40° C. to about 150° C. for a period of about 30 minutes or greater.

13. The method of claim 1, further comprising the step of calcining the metal-organic framework extrudate at a temperature of about 100° C. to about 300° C. for a period of about 1 hour or greater.

14. The method of claim 1, wherein the step of extruding the metal-organic framework is performed through a die with a diameter of about 0.01 mm to about 50 mm.

15. The method of claim 1, further comprising washing the metal-organic framework extrudate with an optional solvent.

16. The method of claim 15, wherein the optional solvent is selected from the group of water, methanol, ethanol, dimethylformamide, acetone, diethylether, acetonitrile, ketones, amides, esters, ethers, nitriles, aromatic hydrocarbons, aliphatic hydrocarbons, and combination(s) thereof.

17. The method of claim 1, wherein the MOF extrudate mixture includes from about 20 wt % to about 70 wt % solids, based on the total weight of the MOF extrudate mixture.

* * * * *